United States Patent Office 3,733,192
Patented May 15, 1973

3,733,192
PLANT FOODS
Frederick John Harris and John Stewart Raitt, Edinburgh, Scotland, assignors to Scottish Agricultural Industries Limited, Edinburgh, Scotland
No Drawing. Filed Mar. 17, 1969, Ser. No. 807,908
Claims priority, application Great Britain, Mar. 28, 1968, 14,966/68; Mar. 14, 1969, 20,217/69
Int. Cl. A01n 21/02
U.S. Cl. 71—77                                                     20 Claims

ABSTRACT OF THE DISCLOSURE

A method of regulating the growth of plants in agriculture and horticulture is described which comprises treating the plants, seeds or the medium in which they are grown with hydrocarbon and substituted hydrocarbon phosphonic and phosphinic acids, amides, esters and salts, and analogous thio compounds, phosphine oxides and sulphides, and compositions containing the same. By selecting the appropriate application rate an increase in the yield can be obtained, e.g. grain yield of cereals and/or an increase in the protein content of the plant. The compounds can be applied in admixture with a diluent, surfactant, fertilizer or weedkiller.

---

This invention relates to compounds and compositions for use in agriculture and horticulture by means of which the growth of plants may be controlled.

The usual method of enhancing the yield of a crop is to treat the medium in which the crop is grown with fertilisers. The efficiency of utilisation of fertilisers, however, depends upon their availability coinciding with the time when the crop requires them.

Another method of enhancing the yield is to alter the environmental conditions under which the crops are grown.

The rate of growth of plants may also be controlled to effect a reduction, which may be partial or complete, in the growth of the plants.

We have now discovered that by the use of the compounds hereinafter defined we are able, by selecting the appropriate application rate to affect the growth of plants and thereby:

(a) increase the useful yield of plants as regards their quantity and/or composition of the economically important parts of the plants and/or
(b) increase the uptake of nitrogen by the crop, thereby increasing the utilisation of the added fertiliser nitrogen and/or increase the percentage nitrogen in the economically important part of the plant and hence its protein content
(c) to suppress the growth of plants.

According to the present invention a method of regulating the growth of plants is provided which comprises treating the plants, seeds or the medium in which they are grown with a compound, a molecule of which includes the structural unit

in which P is a phosphorus atom, W is an unsubstituted or substituted saturated or unsaturated aliphatic group containing 1–20 (preferably 2–10) carbon atoms or an unsubstituted or substituted aromatic (e.g. phenyl or naphthyl) or heterocyclic nucleus linked to the phosphorus atom either directly or through a chain or 1–7 (preferably 1–3) carbon atoms of an unsubstituted or substituted aliphatic group, X is an oxygen or sulphur atom, and Y and Z, which may be the same or different, each comprises an oxygen or nitrogen atom, a carbon atom which is part of an unsubstituted or substituted aromatic (e.g. phenyl or naphthyl) or heterocyclic group, a carbon atom which is part of a chain of 1–7 (preferably 1–3) aliphatic carbon atoms attached to an unsubstituted or substituted aromatic or heterocyclic nucleus, a carbon atom which is part of an unsubstituted or substituted aliphatic group, or, in the case where X is oxygen, a sulphur atom. When Y or Z comprises an oxygen or nitrogen atom the valencies of such atom which are not linked to the phosphorus atom are preferably satisfied by hydrogen, alkali metal, alkaline earth metal atoms or aliphatic or aromatic groups; and when Y and Z comprise a sulphur atom the valencies of such atom which are not linked to the phosphorus atom are preferably satisfied by hydrogen atoms or aliphatic or aromatic groups.

When W is a substituted aromatic, heterocyclic, or alkylene group, the substitutent groups may conveniently comprise a phosphorus atom or atoms and comprise the configuration

in which $X_1$, $Y_1$ and $Z_1$ are groups as hereinbefore defined for X, Y and Z respectively.

It will be realised that the response of plants to a fixed rate of application will vary from one compound to another and from one type of plant to another and that the responses of a particular plant to varying applications of the same compound will also vary. It will be further realised that whereas an amount of a compound when applied within certain limits to a plant may produce a certain effect, for example a favourable increase in yield, the same compound when applied in a different amount may produce a different result, for example a higher concentration may produce a retardation of growth, and a still higher concentration may produce a herbicidal effect.

In general, it is expected that a compound of the invention would be applied either as a means of enhancing the useful yield of crops or to achieve a herbicidal effect.

We have found, however, that a group of the compounds of the invention is particularly favourable for enhancing the useful yield and/or the quality of crops.

For the purpose of enhancing yields of plants W is preferably a substituted or unsubstituted aliphatic group of 1–10 (preferably 2–10) carbon atoms, a substituted or unsubstituted phenyl or naphthyl nucleus linked either directly or through a chain of 1–7 (preferably 1–3) saturated aliphatic carbon atoms to a phosphorus atom, X is oxygen and Y and Z comprises oxygen, nitrogen or a carbon atom which is part of a substituted or unsubstituted aliphatic group of 1–10 (preferably 2–10) carbon atoms. The remaining valencies of Y and Z are preferably satisfield by hydrogen, alkali metal, alkaline earth metal atoms, aliphatic or aromatic groups.

Accordingly, the invention further provides a method of enchancing the growth of plants which comprises treating the plants, seeds or medium in which they are grown with a compound, a molecule of which includes the structural unit

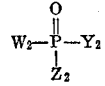

in which P is a phosphorus atom, O is an oxygen atom, $W_2$ is a substituted or unsubstituted aliphatic group of 1–10 (preferably 2–10) carbon atoms, an unsubstituted or substituted aromatic (e.g. phenyl or naphthyl) nucleus linked either directly or through a chain of 1-7 (preferably 1-3) aliphatic carbon atoms to the phosphorus atom, and $Y_2$ and $Z_2$, which may be the same or different, each comprises an oxygen or nitrogen atom or a substituted or unsubstituted aliphatic group of 1-10 (preferably 2-10) carbon atoms. The remaining valencies of $Y_2$ and $Z_2$ which are not linked to the phosphorus atom are preferably satisfied by hydrogen, alkali metal, alkaline earth metal atoms, aliphatic or aromatic groups.

As examples of compounds of the invention the following may be instanced:

| Chemical name | Formula |
| --- | --- |
| Phenyl phosphonic diamide | $C_6H_5-\overset{O}{\underset{NH_2}{\overset{\|}{P}}}-NH_2$ |
| Mono-sodium phenyl phosphonate | $C_6H_5-\overset{O}{\underset{OH}{\overset{\|}{P}}}-ONa$ |
| Sodium phenyl phosphonamidate | $C_6H_5-\overset{O}{\underset{NH_2}{\overset{\|}{P}}}-ONa$ |
| Phenyl thiophosphonic diamide | $C_6H_5-\overset{S}{\underset{NH_2}{\overset{\|}{P}}}-NH_2$ |
| Phenyl phosphonic acid | $C_6H_5-\overset{O}{\underset{OH}{\overset{\|}{P}}}-OH$ |
| p-Chloro phenyl phosphonic acid | $ClC_6H_4-\overset{O}{\underset{OH}{\overset{\|}{P}}}-OH$ |
| p-tolyl phosphonic acid | $CH_3C_6H_4-\overset{O}{\underset{OH}{\overset{\|}{P}}}-OH$ |
| Mono-calcium phenyl phosphonate | $\left[C_6H_5-\overset{O}{\underset{OH}{\overset{\|}{P}}}-O\right]_2 Ca$ |
| Naphthyl phosphonic acid | $C_{10}H_7-\overset{O}{\underset{OH}{\overset{\|}{P}}}-OH$ |
| p-Nitro phenyl phosphonic acid | $NO_2C_6H_4-\overset{O}{\underset{OH}{\overset{\|}{P}}}-OH$ |
| 2,4 dichloro phenyl phosphonic acid | $Cl_2C_6H_3-\overset{O}{\underset{OH}{\overset{\|}{P}}}-OH$ |
| Mono-calcium p-chloro phenyl phosphonate | $\left[ClC_6H_4-\overset{O}{\underset{OH}{\overset{\|}{P}}}-O\right]_2 Ca$ |
| 2,4,5 trichloro phenyl phosphonic acid | $Cl_3C_6H_2-\overset{O}{\underset{OH}{\overset{\|}{P}}}-OH$ |
| Bis naphthyl phosphinic acid | $C_{10}H_7-\overset{O}{\underset{C_{10}H_7}{\overset{\|}{P}}}-OH$ |
| Bis-n-octyl phosphinic acid | $nC_8H_{17}-\overset{O}{\underset{nC_8H_{17}}{\overset{\|}{P}}}-OH$ |
| Bis-n-amyl phosphinic acid | $nC_5H_{11}-\overset{O}{\underset{nC_5H_{11}}{\overset{\|}{P}}}-OH$ |
| Benzyl phosphonic acid | $C_6H_5CH_2-\overset{O}{\underset{OH}{\overset{\|}{P}}}-OH$ |
| Bis phenyl thiophosphinic acid | $C_6H_5-\overset{S}{\underset{C_6H_5}{\overset{\|}{P}}}-OH$ |
| α-Naphthyl methane phosphonic acid | $\alpha\text{-}C_{10}H_6CH_2-\overset{O}{\underset{OH}{\overset{\|}{P}}}-OH$ |
| β-Naphthyl methane phosphonic acid | $\beta\text{-}C_{10}H_7CH_2-\overset{O}{\underset{OH}{\overset{\|}{P}}}-OH$ |
| Triphenyl phosphine oxide | $C_6H_5-\overset{O}{\underset{C_6H_5}{\overset{\|}{P}}}-C_6H_5$ |
| Bis phenyl phosphino thioyl acetic acid | $C_6H_5-\overset{S}{\underset{C_6H_5}{\overset{\|}{P}}}-CH_2-COOH$ |
| Mono-calcium benzyl phosphonate | $\left[C_6H_5CH_2-\overset{O}{\underset{OH}{\overset{\|}{P}}}-O\right]_2 Ca$ |
| Ethyl ester of 2,4,6 triazine triphosphonic acid | (see structure below) |
| β-Chloroethyl phenyl phosphinic acid | $ClCH_2CH_2-\overset{O}{\underset{C_6H_5}{\overset{\|}{P}}}-OH$ |
| Mono-calcium 3-phenyl propylphosphonate | $\left[C_6H_5CH_2CH_2CH_2-\overset{O}{\underset{OH}{\overset{\|}{P}}}-O\right]_2 Ca$ |
| Bis (β-chloroethyl) phosphinic acid | $ClCH_2CH_2-\overset{O}{\underset{CH_2CH_2Cl}{\overset{\|}{P}}}-OH$ |

Ethyl ester of 2,4,6 triazine triphosphonic acid:

$$\begin{array}{c} \text{OEt} \quad\quad \text{OEt} \\ O=P-\underset{N}{\overset{N}{\diagup\hspace{-2pt}\diagdown}}-P=O \\ \text{OEt} \quad N \quad \text{OEt} \\ | \\ EtO-P-OEt \\ \| \\ O \end{array}$$

The compounds may be applied to the seeds, plants or growth medium either without a diluent or in admixture with a suitable diluent. Such diluent may be solid, liquid or slurry.

When used without a diluent they are conveniently applied to the growth medium, or to the seeds prior to sowing. When applied to plants prior to planting out, a compound of the invention may be applied in admixture with a diluent to the roots of the plant.

Examples of solid diluents which may be used are China clay, kieselguhr, diatomite, bentonite, talc or gypsum. The solid diluent may also comprise fertiliser materials.

In one embodiment of the invention the compounds are incorporated with fertiliser ingredients into, for example a compound fertiliser. Examples of suitable fertiliser ingredients are ammonium phosphate, ammonium sulphate, ammonium nitrate, superphosphates, potassium chloride, potassium sulphate or mixtures thereof. The C–P bond in the compounds is relatively stable, so that the compounds are compatible with most fertiliser salts. If desired, the fertiliser incorporating the compound may be granular, pelleted or powdered. Preferably it is granular. The fertiliser may then be applied to the medium in close proximity to the seed by known fertiliser placement techniques.

When applied to seeds the compounds may be applied in admixture with a diluent which may be solid, or fluid. Examples of suitable solid diluents are those instanced above. The liquid may be, for example a surfactant, or non-toxic oil or solvent. As another example of a suitable diluent may be instanced petroleum jelly.

For application to growing plants the compounds are preferably applied in the form of a solution, suspension or emulsion, in admixture with a liquid diluent. When used with a liquid diluent surface active agents may be incorporated.

Examples of liquid diluents which may be used are water, dioxan, alcohols such as for instance ethyl alcohol, methyl alcohol, isopropanol, 2-ethoxyethanol, amyl alcohol and ketones such as for instance acetone or any suitable mixture of such diluents. It will be recognised that the use of liquid diluents other than water will necessitate experiment to determine the quantity of diluent which may safely be used for particular applications. Suitable surface active agents may be selected from known anionic, cationic and non-ionic surface active agents. "Lissapol" (Regd. trademark) is a very suitable surface active agent for the purpose.

If desired, fertiliser salts, for example such as have already been mentioned, may be dissolved or suspended in the liquid.

In one embodiment of the invention the compounds are applied in admixture with a weedkiller which does not have an adverse effect on the growing crop.

In a further embodiment compounds of the invention are applied in admixture with one another to the plants, seeds or the medium in which they are grown.

Thus, according to the present invention, there are provided plant growing regulating compositions comprising an effective amount of at least one compound as hereinbefore defined in admixture with a diluent, surfactant, fertiliser or weedkiller.

Also according to the invention there are provided seeds of potentially improved growth characteristics comprising seeds treated with at least one compound as hereinbefore defined which is capable of enhancing the useful yield of plants.

In some cases seeds from treated plants, from plants grown from treated seeds or from plants grown in a treated medium, in each case the treatment being in accordance with the invention may be found to have improved growth characteristics.

Compounds of the invention have been applied to monocotyledonous plants and dicotyledonous plants and have been found to enhance the growth and quality in both when applied at the correct rate.

We have found that when a compound of the invention, for example bis-n-octyl phosphinic acid, was applied to some monocotyledons, for example barley, oats, maize or rice, as a 0.5% w./v. foliar spray at the 2 leaf stage a band of approximately ½" wide, where much of the tissue had senesced, formed across the leaf near to the base of the leaf. It would appear, however, that the conducting tissue remained functional since the leaf remained green on either side of the senescent band. In addition the tip of the 3rd leaf was withered but the subsequent growth had normal appearance.

When the foliar spray was applied at the 4 leaf stage the band of senescent tissue was noted on the 4th leaf and the tip of the 5th leaf.

When this compound was applied to a matured 2nd leaf of a maize plant, care being taken to avoid the solution coming into contact with the growing point of the plant, the subsequent 3rd leaf was produced with a band of senescent tissue as described above.

When an immature 3rd leaf was so treated the band of senescence appeared on the 3rd leaf and the expected withering at the tip of the 4th leaf.

This indicates that a compound of the invention may be translocated within the plant from the point of application to a point of cell growth.

When applied to dicotyledonous plants, for example radish and turnip, as an 0.5% w./v. foliar spray chlorosis of the leaf occurred within 48 hours and over a period of a week the affected leaves died. The plants remained alive, producing new leaves, but the total crop growth was reduced.

The solubility of the compounds of the invention varies. In general, it is found that phosphonic acid derivatives are more soluble in water than phosphinic acid derivatives. However, solubility of the phosphonic acid derivatives within the scope of the invention varies. Thus, phenyl phosphonic acid and its diamide are soluble in water, whereas its calcium salt is only sparingly soluble.

When a compound of the invention is sparingly soluble in water and it is desired to apply it as a foliar spray, it may be emulsified or it may be applied in an organic solvent in which it is more readily soluble.

In certain cases a sparingly soluble compound of the invention may be solubilised by dissolving it in a dilute solution of alkali (for example sodium hydroxide) and then carefully adding dilute acid, for example hydrochloric acid, to neutralise excess alkali without causing precipitation. On the other hand, an insoluble calcium salt of one of the compounds of the invention may be solubilised by dissolving in dilute acid and readjusting the pH of the solution by the addition of dilute alkali, for example sodium hydroxide.

Alternatively the compound may be brought into suspension by the use of suitable emulsifying agents and applied in that form.

It will be realised that each compound must be tested individually in order to arrive at the best means of application and to determine the correct amount of compound to be applied to achieve a desired result with a particular plant.

When admixed with a growth medium the characteristics, for example pH of such medium must be taken into account.

When applied to a growth medium the compounds may conveniently be added to such an extent that the growth medium contains 2.5–500 p.p.m. (perferably 5–350 p.p.m.) by weight of active compound.

When applied as a foliar spray the compounds may conveniently be applied at rates of from 0.01–20 lb./acre of active compound in order to effect a herbicidal or retarding action on plants. However, for the purposes of enhancing the growth and useful yield of plants, the compounds may conveniently be applied at rates of 0.01–10 lb./acre (preferably 0.05–7.5 lb./acre) of active compound.

It will be appreciated that compounds of the invention may be admixed with a suitable solid or liquid diluent in any desired proportion, for application to the plants, seeds or media in which they are grown so long as the proportion used enables the compound to be applied at the desired rate without unduly high local concentrations of compound being formed when applied. In this respect, a foliar spray would conveniently contain from 0.05% w./v. to 5% w./v. of active compound.

Preliminary tests with chickens on the feeding value of grain produced from seed or plants treated with a compound of the invention have indicated that there is no deleterious effect resulting from their use.

The following examples illustrate the effect of compounds of the invention on the growth of plants.

In all the examples, unless otherwise stated, the results are expressed on a "dry matter" basis. The results given are the average of 3 replicates per test and are measured against control tests which are also the average of 3 replicate tests. All nitrogen uptake figures are based on the duplicate determinations of nitrogen in samples taken from each test yield. Concentrations expressed as parts per millions (p.p.m.) are expressed on a weight basis.

Unless otherwise stated in the following examples the pH of the medium had a value within the range 5.9–6.3.

Tests have confirmed that where an increase has been obtained in the nitrogen content of the economically useful part of the plant, this increased nitrogen is not due to nitrate or nitrite content.

EXAMPLE 1

In this example compounds according to the invention were added at the rate of 100 p.p.m. of compound/pot of growth medium which consisted of 21 lb. of a mixture of 2 parts of sand and 1 part of soil. The pH of this mixture was approximately 6.0. The pots were also supplied with 120 p.p.m. of nitrogen in the form of ammonium nitrate, 200 p.p.m. of $P_2O_5$ in the form of dicalcium phosphate, 150 p.p.m. of $K_2O$ in the form of potassium sulphate, 100 p.p.m. magnesium sulphate and 50 p.p.m. NaCl. 50 seeds of Ymer barley were sown in each pot. Soon after emergence of the young plants (at one and a half leaf stage) the plants were thinned to 35 plants/pot. During growth the pots were kept in a greenhouse under natural lighting conditions, no supplementary lighting being supplied. Heating to maintain a minimum night temperature of 55° F. was supplied as necessary.

Control experiments similar to the above, but omitting the compound of the invention, were carried out under the same conditions. The results were as follows:

| Compound | Grain yield increase over control, percent | Nitrogen uptake increase over control, percent |
|---|---|---|
| 2,4 dichloro phenyl phosphonic acid | 12 | 8 |
| Mono-calcium p-chlorophenyl phosphonate | 9 | 7 |
| 2,4,5 trichlorophenyl phosphonic acid | 9 | 11 |
| Phenyl phosphonic acid | 14 | 15 |
| Bis naphthyl phosphinic acid | 8 | 4 |
| Bis-n-octyl phosphinic acid | 16 | 15 |

Increases were obtained in the grain/straw ratio of plants from pots treated with the compounds, when compared with the control tests.

EXAMPLE 2

In this example which further illustrates the enhancement of yields obtained by use of compounds of the invention, the conditions of test were similar to those of the previous example except that the rate of application of the active ingredient was 25 p.p.m./pot. The crop was barley.

| Compound | Grain yield increase over control, percent | Nitrogen uptake increase over control, percent |
|---|---|---|
| 3,4 dichlorophenyl phosphonic acid | 12 | 15 |
| Mono-calcium benzyl phosphonate | 20 | 19 |
| Mono-calcium phenyl phosphonate | 11 | 17 |
| 2,4,5 trichlorophenyl phosphonic acid | 8 | 16 |

Increases were obtained in the grain/straw ratio of plants from pots treated with the compounds, when compared with the control tests.

EXAMPLE 3

In this example the conditions of test were as in Example 1 except that the rate of application was 5 p.p.m. of active ingredient per pot. Again the enhancement of yield is demonstrated on barely.

| Compound | Grain yield increase over control, percent | Nitrogen uptake increase over control, percent |
|---|---|---|
| Bis phenyl thiophosphinic acid | 7 | 17 |
| α-Naphthyl methane phosphonic acid | 13 | 17 |
| Mono-calcium phenyl phosphonate | 17 | 17 |
| Mono-calcium p-chlorophenyl phosphonate | 12 | 15 |
| Mono-calcium benzyl phosphonate | 10 | 17 |
| 3-chlorophenyl phosphonic acid | 8 | 14 |
| 2,4,5 trichlorophenyl phosphonic acid | 13 | 9 |
| Bis-n-octyl phosphinic acid | 14 | 14 |

EXAMPLE 4

The effect on growth enhancement of application of the compounds of the invention at various rates of addition is demonstrated by the following tests carried out on barley.

| Compound | Rate of addition, p.p.m./pot | Percent increase in grain yield over control |
|---|---|---|
| 2,4-dichlorophenyl phosphonic acid | 5 | 0 |
|  | 25 | 3 |
|  | 100 | 12 |
| Phenyl phosphonic acid | 5 | 1 |
|  | 25 | 5 |
|  | 100 | 14 |

EXAMPLE 5

The suppressant action of compounds according to the invention is illustrated by this example, from which it will be seen that by varying the amount of active ingredient applied to the medium the yield may be suppressed or enhanced. The conditions of test were as in Example 1. The crop was barley.

| Compound | Rate of addition, p.p.m./pot | Percent increase in grain yield over control |
|---|---|---|
| Bis p-chlorophenyl phosphinic acid | 5 | +5 |
|  | 25 | −9 |
|  | 100 | −24 |
| Bis phenyl thio phosphinic acid | 5 | +7 |
|  | 25 | −5 |
|  | 100 | −9 |
| β-Naphthyl methane phosphonic acid | 5 | +6 |
|  | 25 | 0 |
|  | 100 | −17 |
| Mono-calcium p-chlorophenyl phosphonate | 5 | +12 |
|  | 25 | +4 |
|  | 100 | −3 |
| Bis-n-amyl phosphinic acid | 5 | +8 |
|  | 25 | −1 |
|  | 100 | −7 |
| Phenyl phosphonic diamide | 75 | +15 |
|  | 150 | −13 |
|  | 300 | −70 |

This example illustrates that the amount of a compound of the invention to be added to the medium to achieve a desired effect varies from compound to compound and that testing is necessary to determine the optimum amount of a compound to be used to obtain the desired effect.

EXAMPLE 6

In Example 5 the beneficial effect of phenyl phosphonic diamide was demonstrated at a level of 75 p.p.m. by weight. This experiment was carried out under a full nitrogen fertilisation regime. A separate experiment in which the same amount of phenyl phosphonic diamide was added was carried out with reduced nitrogen level (a quarter of full level) when an increase in grain yield of 24% was obtained. The total nitrogen uptake was similar as the nitrogen content of the grain was maintained.

EXAMPLE 7

This example illustrates the use of a compound of the invention as a foliar spray under field conditions.

Trial plots were sown with barley (variety Ymer). The fertiliser application was made at the rate of 3 cwts./acre of a compound fertiliser containing 20% nitrogen, 14% $P_2O_5$ and 14% $K_2O$. A compound of the invention, phenyl phosphonic acid, was applied to plots as a foliar spray of concentration 0.5% w./v. at rates of 1 lb./acre and ½ lb./acre at the 3 leaf stage of growth. The results were as follows:

| Crop | Barley | |
|---|---|---|
| Rate of application, lb | 1 | ½ |
| Grain yield increase over control, percent | 20 | 7 |
| Nitrogen uptake increase over control, percent | 30 | 9 |

EXAMPLE 8

A compound of the invention phenyl phosphonic acid was applied as a foliar spray under field conditions to oat plants at the 3 leaf stage of growth with fertiliser application as in Example 7.

| Rate of application | Grain yield increase over control, percent | Nitrogen uptake increase over control, percent |
|---|---|---|
| 1 lb./acre | 21 | 27 |
| ½ lb./acre | 13 | 11 |

EXAMPLE 9

Compounds of the invention were added at various rates to pots of soil/sand mixture supplied with added fertiliser ingredients as in Example 1. 12 seeds of radish were sown in each pot. Soon after emergence the young seedlings were thinned to 8 plants/pot and allowed to grow to the point of optimum growth, i.e. to the point at which they would normally be harvested to produce good quality produce. Environmental conditions were such as to maintain a day temperature of 65–70° F. and a minimum night temperature of 55° F. Supplementary lighting to supply a 20 hour day length at an intensity of 700 lumen/sq. ft. was provided. Increased yields were obtained as follows:

| Compound | Rate of application, p.p.m. | Fresh weight root increase, percent over control | Increased root nitrogen uptake over control, percent |
|---|---|---|---|
| Mono-calcium phenyl phosphonate | 10 | 29 | 18 |
| Mono-calcium benzyl phosphonate | 10 | 10 | 34 |
| Do | 50 | 8 | 44 |

EXAMPLE 10

In a parallel experiment to that of Example 9 compounds of the invention bis-n-octyl phosphinic acid and mono-calcium phenyl phosphonate were added at various rates to pots of soil/sand medium as in Example 9, and radish were sown, grown and harvested as in that example.

The results illustrate the varying effect which may be obtained on plants by the variation of the rate of application.

| Compound | Rate of application, p.p.m. | Fresh weight root yield increase over control, percent |
|---|---|---|
| Mono-calcium phenyl phosphonate | 200 | −75 |
| | 50 | −15 |
| | 10 | +29 |
| Bis-n-octyl phosphinic acid | 200 | −20 |
| | 50 | −3 |
| | 10 | +15 |

EXAMPLE 11

A compound of the invention, mono-calcium phenyl phosphonate, was applied to a crop of radish as a 0.5% w./v. foliar spray to "run off." The radishes were grown in a soil/sand medium as in Example 9 without any addition of a compound of the invention to the medium and under the same environmental conditions.

The fresh root weight yield of the radishes was increased by 14%.

EXAMPLE 12

A compound of the invention was added at various rates to pots of soil/sand mixture supplied with added fertiliser ingredients as in Example 1 except that there was no added nitrogen. 20 clover seeds were sown in each pot and thinned at a later stage to 10 plants/pot. Environmental conditions were as in Example 9.

The crop was harvested after 12 weeks.

| Compound | Rate of application, p.p.m. | Fresh weight yield increase over control, percent | Nitrogen uptake increase yield over control, percent |
|---|---|---|---|
| Ethyl ester of 2,4,6 triazine triphosphonic acid | 100 | 14 | 32 |
| | 25 | 15 | 18 |

EXAMPLE 13

Compounds of the invention were added as foliar sprays to clover grown as in Example 12. The application was made as 0.5% w./v. solution to "run off" at the 6 trifoliate leaf stage of growth. The plants were harvested 12 weeks after sowing.

| Compound | Fresh weight increased yield, percent | Nitrogen uptake increased yield over control, percent |
|---|---|---|
| Mono-calcium phenyl phosphonate | 20 | 20 |
| Mono-calcium benzyl phosphonate | 13 | 16 |
| Bis-n-octyl phosphinic acid | 19 | 25 |

EXAMPLE 14

A compound of the invention, phenyl phosphonic acid was admixed with fertiliser ingredients to form a compound fertiliser having an approximate analysis 20% nitrogen, 14% $P_2O_5$, 14% $K_2O$ and having incorporated therein 2.5% by weight of the compound. The so treated fertiliser was applied to prepared test plots at the rate of cwt./acre. Plots were seeded with Italian ryegrass and perennial ryegrass. Control plots were laid down at the same time.

Inspection of the plots after 16 weeks showed that the growth of grass was markedly increased in the plot treated with phenyl phosphonic acid.

In pot experiments using ryegrass as the test crop a compound according to the invention, phenyl phosphonic diamide, was incorporated in the growth medium at a rate of 250 p.p.m. by weight, together with sufficient nutrients to ensure complete growth. Control pots similar in all respects to the test pots but omitting the compound were also prepared and all pots sown with the same amount of seed. The yield of grass from pots treated with the compound was reduced by about 10% when compared to the control, but the nitrogen uptake by the grass in the treated pots was increased by almost 50%.

It has been found that compounds of the invention may, if applied in sufficient quantity, be used to retard the growth of grass. Such application has the additional effect of intensifying the green colour of the grass during the growing season and of enabling this colour to be maintained during the winter months.

EXAMPLE 15

Compounds of the invention were applied at the rates shown to boxes containing 14¼ lb. of John Innes No. 1 Compost and having 60 p.p.m. by weight of nitrogen as ammonium nitrate incorporated therein. Lettuce seeds (variety Neptune) were sown in the boxes and the seedlings thinned to two plants/box. The environmental conditions were as in Example 9. The lettuce were harvested 13 weeks after sowing.

| Compound | Rate of application, p.p.m. | Fresh weight yield increase over control, percent | Nitrogen uptake increase yield over control, percent |
|---|---|---|---|
| Bis-n-octyl phosphinic acid | 250 | 17 | 24 |
| Do | 75 | 26 | 42 |
| Do | 25 | 21 | −3 |
| Ethyl ester of 2,4,6-triazine triphosphonic acid | 25 | 24 | 17 |
| Mono-calcium phenyl phosphonate | 25 | 20 | 29 |
| Mono-calcium benzyl phosphonate | 75 | 50 | 53 |
| Do | 25 | 21 | 21 |

EXAMPLE 16

A compound of the invention, ethyl ester of 2,4,6-triazine triphosphonic acid, was applied as an 0.5% w./v. foliar spray to "run off" to lettuce plants grown in a box containing 14¼ lb. of John Innes No. 1 Compost and having 60 p.p.m. by weight of nitrogen in the form of ammonium nitrate incorporated therein. The spray was applied to the plants when they had reached 3″ diameter and prior to the start of formation of the heart. The fresh weight of the lettuce was increased by 22% over a control test.

EXAMPLE 17

Compounds of the invention were applied, at the rates shown, to pots of soil/sand medium. Turnip seeds were sown in the pot and later thinned to 3 plants/pot. The plants were grown under similar environmental conditions to those of Example 9.

The crops were harvested 12 weeks after sowing.

| Compound | Rate of application, p.p.m. | Plant yield increase over control, percent | Nitrogen yield increase over control, percent |
|---|---|---|---|
| Mono-calcium phenyl phosphonate | 10 | 24 | 10 |
| Mono-calcium benzyl phosphonate | 200 | 42 | 41 |
| Do | 50 | 12 | 11 |

EXAMPLE 18

A compound of the invention, mono-calcium benzyl phosphonate was applied as a 0.5% w./v. foliar spray to "run off" to turnip plants at the 4 leaf stage of growth. The turnips were grown as in Example 17.

The crops were harvested 12 weeks after sowing and the treated plants gave a 9% increase in dry weight over a control test.

EXAMPLE 19

Ymer barley was grown in pots as in Example 1 except that the environmental conditions were those used in Example 9. The compound of the invention treated, mono-calcium benzyl phosphonate, was admixed with the medium at the application rate of 5 p.p.m. A 16% grain yield increase over control and a 19% increased nitrogen uptake over control were obtained.

EXAMPLE 20

Pots of Ymer barley grown as in Example 19 were foliar sprayed with compounds of the invention. The concentration used was 0.5% w./v. and the compound was applied at rates equivalent to 0.2 lb., 1 lb. and 6 lb./acre. The results obtained were as follows:

| Compound | Rate, lb./acre | Stage of application | Grain yield increase over control, percent | Nitrogen uptake increase over control, percent |
|---|---|---|---|---|
| Mono-calcium benzyl phosphonate. | 1 | 2 leaf | 30 | 23 |
| Bis-n-octyl phosphinic acid. | 0.2 | do | 18 | 28 |
| Do | 0.2 | 4 leaf | 36 | 20 |
| Bis benzyl thiophosphinic acid. | 6 | do | 25 | 10 |

EXAMPLE 21

Compounds according to the invention were added at the rates shown to pots containing a soil/sand medium and an adequate supply of phosphate, potash and minor plant nutrients. The nitrogen addition in the growth medium was at a level of 45 p.p.m. nitrogen, if necessary being supplied in the form of ammonium nitrate. In one instance the nitrogen level in the growth medium was 90 p.p.m. nitrogen. The crop tested was oats.

| Compound | Rate of addition, p.p.m. | Grain yield increase over control, percent | Nitrogen uptake increase over control, percent |
|---|---|---|---|
| Phenyl phosphonic diamide | 250 | 23 | 63 |
| Phenyl phosphonic diamide (plus 45 p.p.m. nitrogen) | 250 | 20 | 64 |
| p-Nitro phenyl phosphonic acid | 50 | 7 | 5 |
| Benzyl phosphonic acid | 50 | 12 | 13 |
| Phenyl thiophosphonic aicd | 250 | 30 | 46 |

EXAMPLE 22

Maize (variety SA 200) was grown in test plots under normal field conditions in rows 3 ft. apart with 1 ft. between plants. At planting a fertiliser dressing of 3 cwts./acre of a fertiliser containing 6% nitrogen, 9% $P_2O_5$ and 12% $K_2O$ was applied. At a later stage of growth when plants were 15 inches high a further dressing of 100 lbs./acre of urea (containing 46% nitrogen) was applied.

Foliar applications of compounds of the invention at the 4 leaf stage of growth were made to the test plots at various rates with the following results. Results are the mean of 6 replicate tests.

| Compound | Rate of application, lbs./acre | Grain yield increase over control, percent | Ear/plant ratio | Nitrogen uptake increase over control, percent |
|---|---|---|---|---|
| Benzyl phosphonic acid | 0.25 | 4.0 | 1.03 | −4 |
|  | 1.0 | 10.0 | 1.03 | 12 |
|  | 4.0 | 18.0 | 0.99 | 18 |
| Phenyl phosphonic acid | 0.25 | 11.0 | 1.07 | 1 |
| Control |  |  | 0.91 |  |

EXAMPLE 23

Soya beans (variety Masterpiece) were grown in test plots under normal field conditions in rows 3 ft. apart. The seeds were sown at the rate of 40 lbs./acre. Fertiliser dressings were applied as outlined in Example 22.

A compound of the invention was applied to the seeds in admixture with separated milk to obtain adherence of the compound to the seed.

Results quoted are the mean of 6 replicate tests and are compared to control plots which were grown with untreated seed.

| Compound | Rate of application to seed, percent w./v. | Fresh weight yield increase over control, percent | Nitrogen uptake increase over control, percent |
|---|---|---|---|
| Calcium benzyl phosphonate | 5 | 8 | 8 |
|  | 1 | 7 | 5 |

EXAMPLE 24

A compound of the invention, phenyl phosphonic diamide, was applied to pots of soil/sand medium at the rate of 150 p.p.m. The pots were sown with wheat and grown in the open under bird-proof cages.

Each pot was otherwise as treated in Example 1 with respect to fertiliser application and methods of sowing and thinning. After 10 weeks under these conditions the pots were brought indoors and kept under the environmental conditions of Example 9 for a further 4 weeks after which time the crop was harvested. An increase in dry weight of 14% was obtained. The pH of the medium in this example was 5.8.

EXAMPLE 25

Barley plants were grown in pots under the conditions of Example 1 and under environmental conditions of Example 9.

Compounds of the invention were applied to the growing plants as foliar sprays at the 2 leaf stage of growth.

| Compound | Rate of addition, lbs./acre | Increase grain yield over control, percent | Increased nitrogen uptake over control, percent |
|---|---|---|---|
| Mono-calcium benzyl phosphonate | 1 | 30 | 23 |
| Ethyl ester of 2,4,6 triazine triphosphonic acid | 2½ | 10 | 9 |
| Bis (β-chloroethyl) phosphinic acid | 0.5 | 5 |  |
| Phenyl β-chloroethyl phosphinic acid | 2½ | 12 | 5 |
| Mono-calcium 3-phenyl propyl phosphonate | 2½ | 9 | 5 |

EXAMPLE 26

Barley (variety Olli) was grown in pots as in Example 1 and under the environmental conditions of Example 9. Compounds of the invention were mixed into the medium at the rates shown. The crops were harvested after 14 weeks and compared with controls grown under the same conditions.

| Compound | Rate of addition, p.p.m. | Grain yield increase over control, percent | Nitrogen uptake increase over control, percent |
|---|---|---|---|
| Mono-calcium phenyl phosphonate | 50 | 21 | 20 |
| β-Chloroethyl phenyl phosphinic acid | 50 | 23 | 21 |
|  | 10 | 19 | 13 |
| Bis ethyl amino phenyl phosphonic acid | 50 | 14 | 12 |
| Diethyl ester of 2,4,6 triazine triphosphonic acid | 50 | 8 | 13 |

EXAMPLE 27

This example illustrates the use of a compound of the invention in admixture with fertiliser ingredients under field conditions.

A granular concentrated complete fertiliser was prepared incorporating 2.5% phenyl phosphonic acid. The fertiliser formulation was such as would have given an analysis of 20% nitrogen, 14% total $P_2O_5$ and 14% $K_2O$ if no phenyl phosphonic acid had been added. It was considered that the amount of dilution brought about by the addition of the phenyl phosphonic acid was negligible for the purposes of the test.

The fertiliser was applied to prepared plots at the rate of 3 cwts./acre by placement in the soil adjacent to the seed at the time of sowing. The crop used was barley (variety Ymer) and a control test was carried out at the same time.

Percent
Grain yield increase over control _____ 7
Nitrogen uptake increase over control _____ 18

Thus, although the fertiliser application was marginally less than the fertiliser applied to the control, there was a substantial nitrogen uptake increase.

EXAMPLE 28

Some of the compounds of the invention exhibit a strong suppressant action as illustrated by the following tests carried out on barley under the conditions of Example 1.

| Compound | Rate of addition, p.p.m. | Percent increase in yield over control |
|---|---|---|
| Triphenyl phosphine oxide | 5 | −14 |
|  | 25 | −25 |
|  | 100 | −82 |
| p-Chlorobenzyl phosphonic acid | 5 | −2 |
|  | 25 | −7 |
|  | 100 | −79 |
| Bis phenyl phosphinothioyl acetic acid | 5 | −4 |
|  | 50 | −92 |

EXAMPLE 29

In order to demonstrate that the compounds of the invention are not deleterious to germination when applied as a seed dressing, 2% by weight of phenyl phosphoric diamide was applied with 1.5% by weight of petroleum jelly to oats seeds. Laboratory germination tests showed that there was no diminution in germination with these seeds compared with those coated with 1.5% petroleum jelly only or uncoated seeds.

EXAMPLE 30

Seeds from a plant grown from seed treated with a compound of the invention, phenyl phosphonic diamide, were subjected to routine seed germination tests. The results of the test showed a high germination rate (90–100%) comparable with that of good quality seed from untreated plants.

What we claim is:

1. A process for enhancing plant growth which comprises applying to crop plants, in an amount effective to enhance the yield of the crop by action on the plant metabolism, a compound selected from the group consisting of (1) compounds of formula:

wherein X is selected from the group consisting of oxygen and sulphur; W is a $-(CH_2)_n-$ R radical where R is selected from the group consisting of naphthyl, phenyl, halosubstituted phenyl, nitro substituted phenyl and alkyl substituted phenyl and $n$ is an integer from 0 to 7; Y is selected from the group consisting of hydroxy, amino, 2-haloethyl and a radical defined for W; and X is selected from the group consisting of hydroxyl and amino; and (2) non-phytotoxic salts and esters thereof.

2. A process according to claim 1 wherein the crop plants are cereals.

3. A process according to claim 1 wherein the crop plants are grass.

4. A process according to claim 1 wherein the compound is selected from the group consisting of compounds of formula:

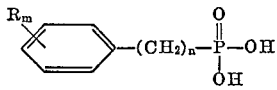

where $n$ is 1, 2, or 3, R is selected from the group consisting of halogen and alkyl and $m$ is 0, 1, 2 or 3 and the salts and esters thereof.

5. A process according to claim 4 wherein the compound is selected from phenyl phosphonic acid and salts and esters thereof.

6. A process according to claim 4 wherein the compound is selected from p-chlorobenzyl phosphonic acid and salts and esters thereof.

7. A process according to claim 4 wherein the compound is selected from p-chlorobenzyl phosphonic acid and salts and esters thereof.

8. A process as claimed in claim 1 wherein the compound is applied as a foliar spray at a rate of 0.01–10 lbs. per acre.

9. A process as claimed in claim 8 in which the rate is 0.01–7.5 lbs. per acre.

10. A process according to claim 1 wherein the compound is applied to crop plants by treating seeds thereof with a seed dressing containing said compound.

11. A process of enhancing plant growth which comprises applying to crop plants, in an amount effective to enhance the nitrogen content thereof by action on the plant metabolism, a compound selected from the group consisting of:
(1) compounds of formula:

wherein X is selected from the group consisting of oxygen and sulphur; W is a —(CH$_2$)$_n$—R radical where R is selected from the group consisting of naphthyl, phenyl, halo-substituted phenyl, nitro substituted phenyl and alkyl substituted phenyl and $n$ is an integer from 0 to 7; Y is selected from the group consisting of hydroxyl, amino, 2-haloethyl and a radical defined for W; and Z is selected from the group consisting of hydroxyl and amino; and (2) non-phytotoxic salts and esters thereof.

12. A process according to claim 11 wherein the crop plants are cereals.

13. A process according to claim 11 wherein the crop plants are grass.

14. A process according to claim 11 wherein the compound is selected from the group consisting of compounds of formula:

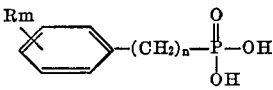

wherein $n$ is 1, 2 or 3, R is selected from the group consisting of halogen and alkyl and $m$ is 0, 1, 2 or 3 and the salts and esters thereof.

15. A process according to claim 14 wherein the compound is selected from phenyl phosphonic acid and salts and esters thereof.

16. A process according to claim 14 wherein the compound is selected from 3-phenylpropylphosphonic acid and salts and esters thereof.

17. A process as claimed in claim 11 wherein the compound is applied to the crop plants as a foliar spray.

18. A process according to claim 11 wherein the compound is applied to crop plants by treating seeds thereof with a seed dressing containing said compound.

19. A process as claimed in claim 4 wherein the compound is the mono-calcium salt of 3-phenyl propyl phosphonic acid.

20. A process as claimed in claim 14 wherein the compound is the mono-calcium salt of 3-phenyl propyl phosphonic acid.

References Cited
UNITED STATES PATENTS

| | | | |
|---|---|---|---|
| 3,223,514 | 12/1965 | Gradsten | 71—86 |
| 3,515,537 | 6/1970 | Weil et al. | 71—86 |
| 3,539,331 | 11/1970 | Smith | 71—86 |
| 3,562,363 | 2/1971 | Randall | 71—86 X |

JAMES O. THOMAS, JR., Primary Examiner

U.S. Cl. X.R.

71—76, 86, 87